(12) United States Patent
Liu et al.

(10) Patent No.: US 9,754,177 B2
(45) Date of Patent: Sep. 5, 2017

(54) IDENTIFYING OBJECTS WITHIN AN IMAGE

(71) Applicant: Microsoft Corporation, Redmond, WA (US)

(72) Inventors: Ce Liu, Arlington, MA (US); Yair Weiss, Brookline, MA (US); Antonio Torralba Barriuso, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 13/923,820

(22) Filed: Jun. 21, 2013

(65) Prior Publication Data

US 2014/0376819 A1    Dec. 25, 2014

(51) Int. Cl.
| | |
|---|---|
| G06K 9/62 | (2006.01) |
| G06K 9/32 | (2006.01) |
| G06T 7/187 | (2017.01) |
| G06K 9/34 | (2006.01) |
| G06K 9/00 | (2006.01) |
| G06K 9/52 | (2006.01) |
| G06K 9/46 | (2006.01) |

(52) U.S. Cl.
CPC ....... *G06K 9/3233* (2013.01); *G06K 9/00536* (2013.01); *G06K 9/34* (2013.01); *G06K 9/342* (2013.01); *G06K 9/527* (2013.01); *G06K 9/6201* (2013.01); *G06K 9/6215* (2013.01); *G06K 9/6269* (2013.01); *G06T 7/187* (2017.01); *G06K 2009/4666* (2013.01); *G06K 2009/6213* (2013.01)

(58) Field of Classification Search
USPC ....... 382/159, 173, 180, 181, 190, 195, 206, 382/209, 224, 282, 291
See application file for complete search history.

(56) References Cited

U.S. PATENT DOCUMENTS

| | | | | |
|---|---|---|---|---|
| 6,317,740 | B1* | 11/2001 | Mukherjea | G06F 17/30017 707/758 |
| 7,043,474 | B2* | 5/2006 | Mojsilovic | G06K 9/6215 382/173 |
| 8,180,178 | B2* | 5/2012 | Cheatle | G06K 9/00234 382/100 |
| 8,194,986 | B2* | 6/2012 | Conwell | G06K 9/6201 382/224 |
| 8,560,517 | B2* | 10/2013 | Yang | G06F 17/30277 382/170 |
| 2002/0090132 | A1* | 7/2002 | Boncyk et al. | 382/154 |
| 2002/0122596 | A1* | 9/2002 | Bradshaw | 382/226 |
| 2007/0271226 | A1* | 11/2007 | Zhang | G06F 17/30265 |
| 2007/0288408 | A1* | 12/2007 | Li et al. | 706/19 |
| 2009/0289942 | A1* | 11/2009 | Bailloeul | G06K 9/6247 382/305 |

(Continued)

*Primary Examiner* — Eric Rush

(57) ABSTRACT

One or more aspects of the subject disclosure are directed towards identifying objects within an image via image searching/matching. In one aspect, an image is processed into bounding boxes, with the bounding boxes further processed to each surround a possible object. A sub-image of pixels corresponding to the bounding box is featurized for matching with tagged database images. The information (tags) associated with any matched images is processed to identify/categorize the sub-image and thus the object corresponding thereto.

20 Claims, 10 Drawing Sheets

(56) References Cited

U.S. PATENT DOCUMENTS

| | | | |
|---|---|---|---|
| 2009/0297050 A1* | 12/2009 | Li ........................ | G06K 9/622 |
| | | | 382/225 |
| 2010/0226564 A1* | 9/2010 | Marchesotti et al. ........ | 382/159 |
| 2011/0123120 A1* | 5/2011 | Quack .......................... | 382/197 |
| 2012/0039527 A1* | 2/2012 | Qi et al. ....................... | 382/159 |
| 2012/0076408 A1* | 3/2012 | Suk et al. .................... | 382/173 |
| 2013/0011069 A1* | 1/2013 | Quan ................ | G06K 9/00704 |
| | | | 382/190 |
| 2014/0233854 A1* | 8/2014 | Zhong ............... | G06K 9/00671 |
| | | | 382/190 |

* cited by examiner

IDENTIFYING OBJECTS WITHIN AN IMAGE

BACKGROUND

Contemporary image recognition technologies are mostly classifier-based. Typically, positive and negative samples are gathered for each object/scene category to train a classifier. At running time, the classifier is applied to an input image to recognize the image.

However, the training does not scale with respect to the number of object/scene categories. Labeling good training samples for many categories is very tedious work for humans, while training many classifiers on large amounts of data is computationally expensive.

Further, contemporary image recognition technologies do not cover both category and instance recognition. For example, in current face recognizers, an image is first processed with a people/face detector to find people, and then a face recognition system is trained to differentiate the people. Likewise, a car detector is trained to find cars, and then a car recognition system is trained to identify manufacture, model and make.

Still further, contemporary image recognition systems do not fit the dynamic nature of image recognition very well. For example, the number of object/instance categories continues to grow over time; however when a new category is added, the entire system needs re-training, which can be very time-consuming.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards identifying objects within an image by searching an image database to find matching, tagged images. One or more aspects are directed towards processing an image, including computing a bounding box corresponding to a potential object within an image and extracting a sub-image corresponding to the bounding box. Data (e.g., features) corresponding to the sub-image are used to query an image database to obtain one or more matched images for the sub-image. The sub-image is identified and/or categorized based upon information (e.g., tags) associated with the one or more matched images.

One or more aspects are directed towards an image processing pipeline, including a bounding box generation stage configured to select a sub-image from an input image. An image-to-image search stage of the pipeline queries an image database with data corresponding to the sub-image to obtain identification-related or category-related information of one or more matched images. An identification stage of the pipeline processes the identification-related and/or category-related information corresponding to the one or more matched images to identify and/or categorize the sub-image, e.g., to label an object.

One or more aspects are directed towards inputting an image and generating bounding boxes to determine sub-images corresponding to possible objects within the image and features of the sub-images. For each sub-image, an image database having tagged images with features corresponding to the sub-image is queried to match an object corresponding to the sub-image with (zero or more matched) tagged images in the image database.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards recognizing objects in an image, e.g., as object categories/identities. Objects may be localized in the image in the form of bounding boxes. Example usage scenarios include to tagging images for image search engines, identifying unknown objects through a smartphone, (e.g., possibly in real time), indexing and search personal photo albums, and so on.

In one or more implementations, an image recognition system is based upon image-to-image search engines, in contrast to training large classifiers. For a given query image, the system first proposes good, salient bounding boxes that may contain potential objects of interests (e.g., visual objects that correspond to human perception). The sub-images encapsulated by the bounding boxes are queried to an extremely-large-scale image-to-image search engine (e.g. at the scale of all search engine images, such as on the order of billions of images) to look for similar images based on image features. A pre-trained classifier may be applied to each retrieved similar image to decide whether such similar image is a good match. If good matches are found for a bounding box, tags are generated from aggregating the information from the matched images in the database (on the assumption that images in the database have been noisily tagged, as in contemporary search engines). The tags are integrated/pruned for the query image to produce a clean parsing of the image.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and image processing in general.

Figure 1:
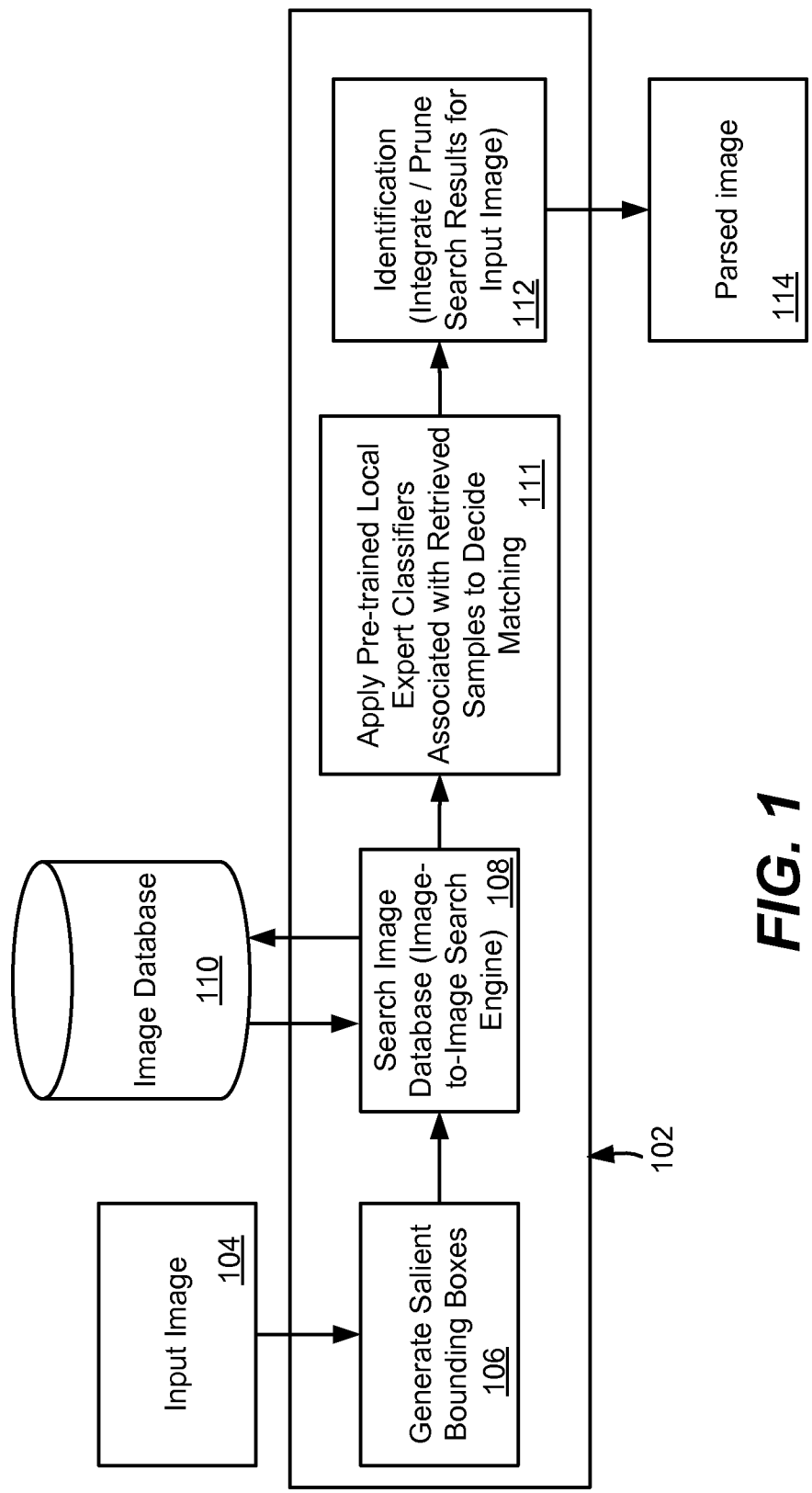
FIG. 1 is a block diagram representing an example pipeline comprising stages (e.g., modules) configured to identify objects in images via image searching, according to one or more example implementations.

FIG. 1 shows an image recognition system configured as an image recognition pipeline 102 that detects and recognizes salient objects in an input image 104. In one or more implementations, the system includes three pipeline stages for processing the input image 104, including a stage that generates salient bounding boxes, shown as 106. Another stage, shown as stage 108 searches an image database 110 (e.g., comprising one or more image data stores). A pre-trained local expert classifier 111 associated with each retrieved image is applied to determine whether the tagged info is to be applied to the query. After that, the retrieved tag/label information is processed for an identification of the image, e.g., by an integrate/prune search results stage 112 to output a parsed image 114, for example, or data corresponding thereto. Each of the stages is described hereinafter.

The pipeline 102 can be used in a search engine, for example, to improve general image-to-text relevance. Another instance of the pipeline 102 also may be used in smaller devices, such as a smartphone or tablet computing device, e.g., to identify products/places/people to parse an image for the user. Another instance of the pipeline 102 may be implemented in a cloud service, e.g., that receives an uploaded image, performs the processing in the cloud to request a search, and processes the search results to return the parsed imaged. In general, any machine capable of inputting an image, processing the image as described herein and communicating/networking may implement the technology system described herein.

With respect to enumerating the salient bounding boxes that are likely candidates for containing an object, an image may contain flat regions (e.g., sky, wall and floor) that can be easily identified from the image itself. Salient regions, e.g., where saliency may be defined in terms of unique color/texture compared to the surroundings, are likely to contain objects of interests.

Therefore, one or more implementations generate M bounding boxes (where M may be on the order of a thousand to five thousand) that are likely to correspond to object of interests to save computation time. For an image having N pixels, there are $\frac{1}{4}N(N-1)$ possible bonding boxes. For example, a 640×480 image has N=307,200 pixels, whereby there are $2.36 \times 10^{10}$ possible bounding boxes. Thus, generating salient, promising bounding boxes instead of all possible boxes greatly improves the efficiency.

One of a number of feasible technologies available for the stage 106 is "objectness," in which a set of positive samples labeled as objects (people, animal, products, and so forth) and a set of negative samples are collected and labeled. The samples may be used to train a classifier to recognize objects from non-objects.

Another technology is generating bounding boxes from segmentation. In segmentation, pixels are clustered (e.g., using mean shift clustering) based upon their coordinates and RGB values. Segmentation is well-known in image processing, and for brevity is not described hereinafter.

Bounding boxes are built from combinations of the segments. Once the bounding boxes are enumerated, a link analysis may be performed on the bonding boxes such that the bounding boxes are re-ranked due to saliency metrics. A bounding box is a "good" one when it is sufficiently different from other ones. One or more page-rank like algorithms may be used to perform the ranking. Those bounding boxes that are not good because they do not contain enough variation (e.g., relative to a configurable threshold) are discarded, e.g., because they are likely not objects. Note that the corners of a bounding box are less likely to be inside the segments.

Figure 2:
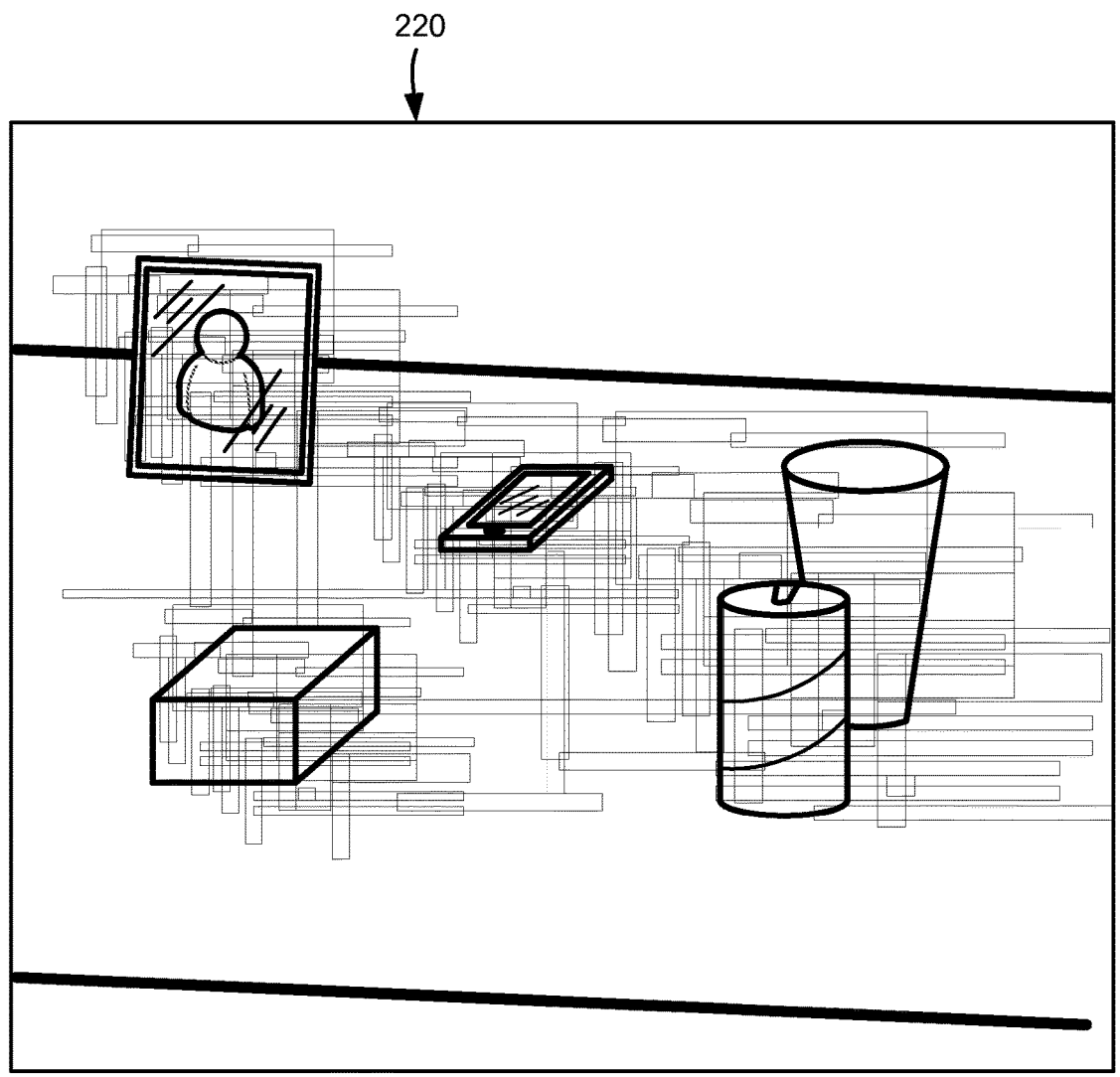
FIG. 2 is a representation of an image being processed into bounding boxes, which are combined into bounding boxes corresponding to sub-images, according to one or more example implementations.

FIG. 2 represents an image 220 with generated bounding boxes around potential objects. Note that FIG. 2 is only provided for purposes of illustration, and that the size, density, distribution and number of bounding boxes shown are not intended to convey any actual values. Note however, that in practice because of variation, the bounding boxes are mostly around where potential objects appear, as generally represented in FIG. 2.

The boxes are merged into regions using a bounding box generation algorithm. One suitable bounding box generation algorithm is set forth below and represented as steps in the example flow diagram of FIG. 3:

Step 301: obtain a segmentation of the image.

Step 302: start a running list of bounding boxes in the image by adding the bounding boxes that are tightly around each segment.

Step 303: calculate the similarities between each region and its neighbors, e.g., using the following equation (where a and b are two different neighboring regions):

$$S(a,b)=S_{size}(a,b)+S_{texture}(a,b)$$

$S_{size}(a,b)$ is defined as the fraction of the image that the segment a and b jointly occupy. $S_{texture}$ is defined as the histogram intersection between SIFT-like texture measurements obtained for each color channel separately, e.g., (concatenate the SIFT histograms for each of the color channels and calculate the histogram intersection between the two regions).

Step 304: use a greedy algorithm to iteratively group the two most similar regions together into a new region.

Step 305: add the tight bounding boxes around this segment to the running list of bounding boxes in the image.

Step 306: update the similarities between this new region and its neighbors using the same similarity equation.

Step 307: repeat steps 304-306 until the entire image is one region.

Figure 4:
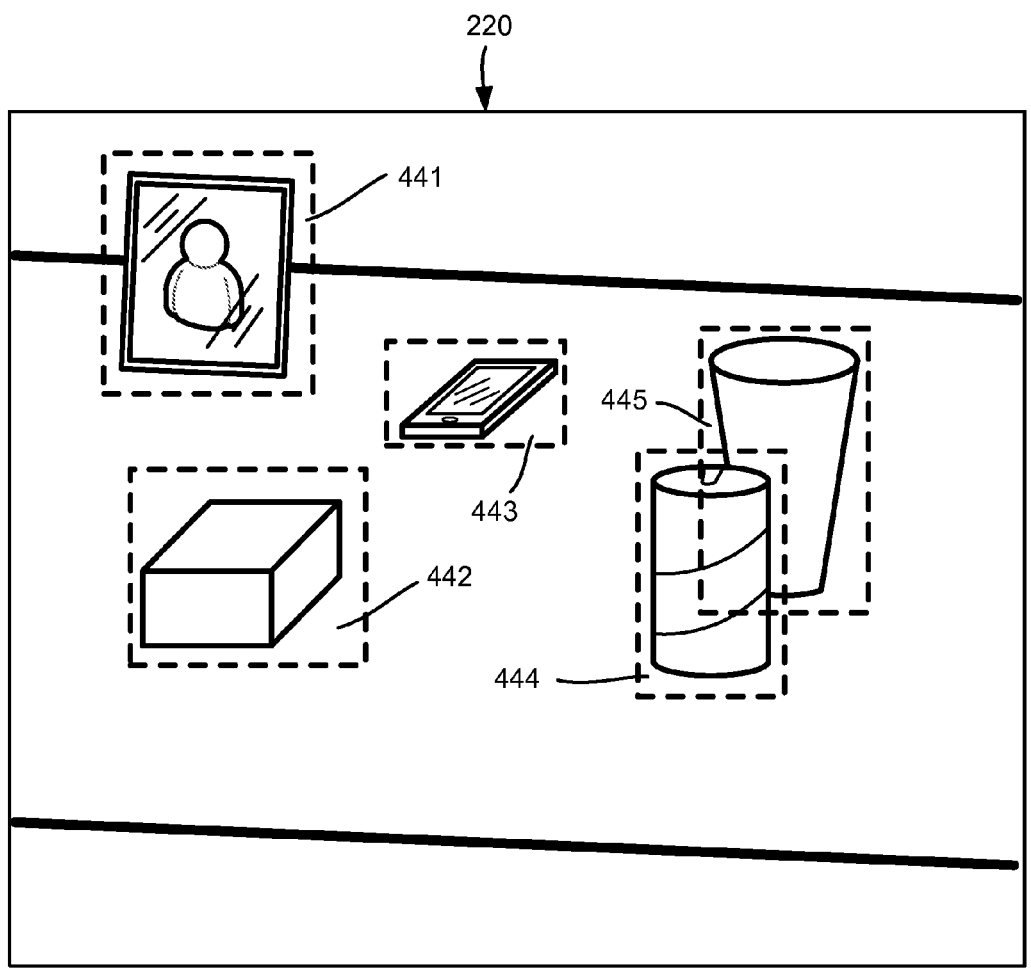
FIG. 4 is a representation of an image being divided into sub-images based upon generated bounding boxes, according to one or more example implementations.

FIG. 4 represents how the remaining bounding boxes 441-445 (the dashed boxes) encompass sub-images of the images. Each of these sub-images can be searched to determine whether it contains a known object, and if so, to identify/classify what the object is, as described herein.

Turning to the image-to-image searching, stage 108 of FIG. 1, as soon as a compact set of bounding boxes are determined for an input image, the sub-images corresponding to the bounding boxes are extracted and sent as a query to search over a large collection of annotated images. This collection of images, for example, can come from the images currently indexed by search engines such as Bing®.

The image search engine may be based upon using global and/or local features. In general, a local feature approach extracts visual words from images, quantizes them, and use minhash or geometric hashing to index the images. A global feature approach converts global image features (such as GIST) to hash codes such that similar images are likely to be grouped into one hash bucket and dissimilar images are unlikely to be grouped (such as spectral hashing). Principle component analysis (PCA) and hashing are thus one suitable technique to help match image features of the query image to those in the large database. In general, the sub-image features are queried against image-to-image search engines to recognize objects; efficient hashing is implemented for very-large-scale image sets having billions of images.

One or more implementations use the global feature approach because doing so allows for more variation for the query image. A suitable search engine that fits into the image-to-image search engine stage 106 is based upon speed and accuracy (high precision).

With respect to compute descriptors for each bounding box, once the bounding boxes are extracted from the image, the image-to-image search engine stage 106 extracts representative features from the bounding box to represent the visual information. As is known, the luminance or color information of an image or an image patch can be unreliable as image features because of lighting, pose and viewing-angle changes even for the same subject. Therefore, a solution may be based upon extracting multi-orientation, multi-scale gradient energies as is known in the art of computer vision. However, such algorithms need to work efficiently for the many bounding boxes in an image.

Described herein is using multi-orientation steerable filters at several scales for feature designs similar to that of GIST. Note that the typical choice in obtaining multi-orientation derivative filtering responses from an image is to use Gabor filters; however, these filters can be too large to perform efficiently in the spatial domain, and there are normally many orientation bands to obtain.

In contrast, steerable filters are designed such that any orientational filter can be obtained by interpolating some base filters, which are horizontally and vertically separable filters that can be performed as one-dimensional (1 D) horizontal filtering followed by 1D vertical filtering. The computational complexity of separable filters is O(n) instead of $O(n^2)$, where n is the window length of the filter.

The orientational derivative filters have sin (odd) and cos (even) components, corresponding to step edges and ridges, respectively. In the context of steerable filters, the even component is called G filter and the odd component is called H filter. Orientational filtering is obtained by interpolating the base G and H filters.

Similar to the well-known GIST and HOG descriptors, the histogram of band-pass filtering responses over orientations are obtained to characterize the image content. In one or more implementations, the image is divided into an uniform array of 4×4 cells, and the histogram of orientation energy computed in eight angles (evenly distributed in 0~180°). The operation may be performed at four scales of the image on a Gaussian pyramid, e.g., with a down-sampling rate of 0.64.

Contrast normalization may be performed before steerable filtering to normalize the lighting variations in digital photos. In one or more implementations, contrast normalization is performed by obtaining the Laplacian of the image, and dividing the local maximum, e.g.

$$L(x, y) = I(x, y) - I(x, y) * G(u, v)$$

$$J(x, y) = L(x, y) \Big/ \Big(\epsilon + \max_{-s \leq u, v \leq s} L(x+u, y+v)\Big)$$

where I(x, y) is the image, G (u, v) is a Gaussian filter, L (x, y) is the Laplacian of the image, ε is a small number to count for textureless regions, and s is the half window size.

A general goal is to obtain features for many bounding boxes (e.g., between three and five thousand). If extracting the descriptor from an image takes 0.01 second, then extracting 3,000 bounding boxes would take 30 seconds. Therefore, it is inefficient to repeat the image feature extraction process for the patch encapsulated by each bounding box.

Figure 5:
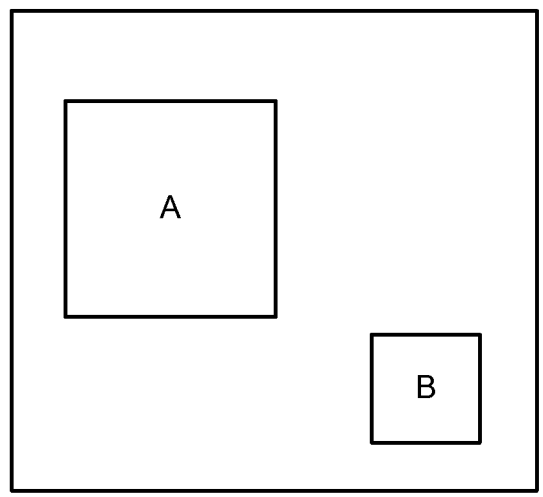
FIG. 5 is a representation of a pyramid scheme used to extract features from sub-images, according to one or more example implementations.
Figure 5:
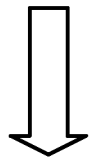
Figure 5:
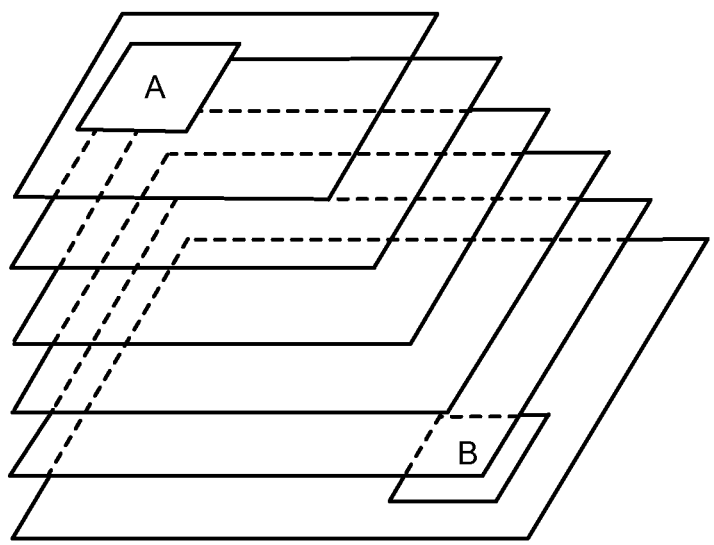

Described herein is a scheme to efficiently extract features for a set of bounding boxes in an image. It would be too time consuming to do image level feature extraction for every bounding box. Therefore, a pyramid representation may be used so that a bounding box is matched to the best pyramid level, and the features extracted accordingly. As shown in FIG. 5, a dense Gaussian pyramid of the image may be built. Then each bounding box can be projected to the closest level of the pyramid. Because steerable filtering is performed at each level with the same parameter, it is straightforward to extract features from the levels above and from the same regions and concatenate them into descriptor.

Integral images are used in one implementation for fast summation of orientational energy within a region. Because there are many overlapping bounding boxes, multiple summation may be avoided by first forming an integral image:

$$J(x, y) = \sum_{x' \leq x, y' \leq y} I(x, y)$$

The summation over a rectangle region $(x_1, y_1, x_2, y_2)$ is:

$$\sum_{x_1 \leq x \leq x_2, y_1 \leq y \leq y_2} I(x, y) = J(x_2, y_2) - J(x_1, y_2) - J(x_2, y_1) + J(x_1, x_2)$$

Once a bounding box finds good matches from the image database, tags are merged from matched images and transferred to the query bounding box.

Note that the technology described herein is not bound to particular image descriptors like GIST. Other image descriptors may be used, such as the features extracted from deep-convolutional neural networks, or the descriptors captured by dictionary learning (by clustering good patches).

For example, instead of (or in addition to) band-pass filters such as steerable/Gabor filters to capture orientational image statistics, the system may learn filters that fit to the image set through learning patch-based dictionaries. This may be done by doing k-means clustering of patches randomly drawn from the database, and use the mean of each cluster as filters. This has been shown to be effective in learning the first layers of the deep-convolutional neural networks.

Figure 6:
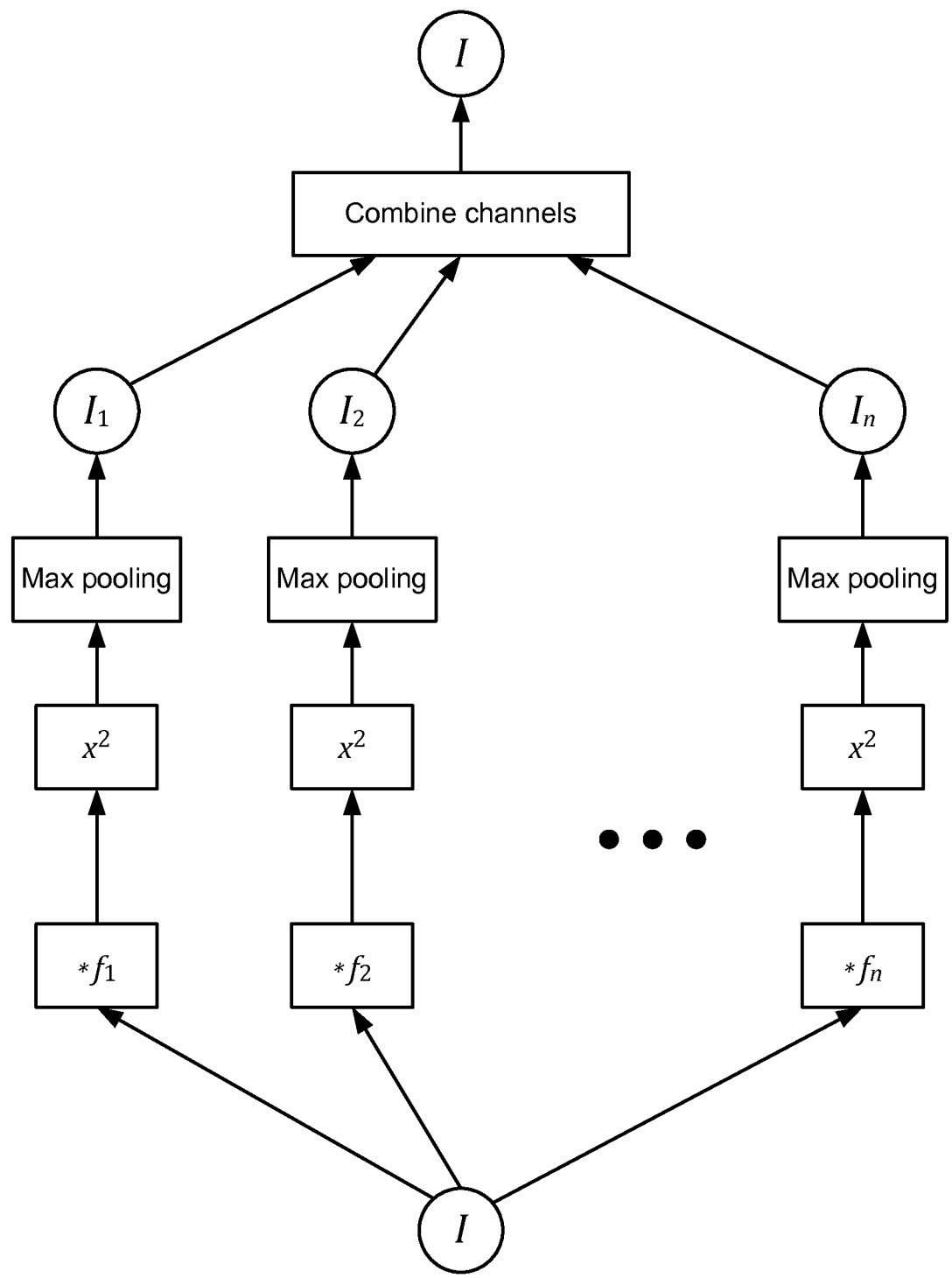
FIG. 6 is a representation of features, according to one or more example implementations.

Another approach is to use random filters, as shown in FIG. 6. FIG. 6 shows a recursive structure, with features similar to deep-convolutional neural network, where the input is an image and the output is also an image. The system first uses n random filters to convolve with the input image, and then performs pixel-wise squaring, and max pooling (similar to Gaussian filtering, but obtaining a maximum instead of weighted sum), to obtain images $I_1$ to $I_n$. By concatenating the images together, the system obtains a new image I. The system may go through this process multiple times and obtain a spatial histogram in 4×4 cells to obtain the descriptor. This exemplified pipeline is a multiple layer version of the GIST descriptor, and the filter is not bounded to band-pass filters; it can be random noise, or random patches from the images, or the projection feature associated with learned classifiers.

The descriptors also may be classifier outputs to fill in the semantic gap between descriptors and semantic labels. For example, the system may form a set of images associated with "car", and another set of images not associated with cars (called "noncar"). The system can learn a classifier to distinguish cars from noncars, and the classifier output forms one dimension. This process may be lopped over a set of semantics, e.g. "people", "face", "mountain", "cats", "computer", "smart phone," "food," "clothes," and so forth to form final image descriptors.

Turning to example details of a large scale image search system using hashing, for a query patch, once exemplar are retrieved from the image search system, a decision need to be made as to whether the information of each exemplar is to be transferred to annotate the query patch. A simple approach is to put a threshold on the distance. Mathematically, let $X=\{x_1, \ldots, x_N\}$ be the database where $x_i$ is a sample, and let $L=\{l_1, \ldots, l_N\}$ be the corresponding tagged information. Let y be the query sample. Here both $x_i \in R^D$ and $y \in R^D$ are vectors in the image feature space. The tag information $l_i$ comes from a dictionary of commonly used words (e.g., it can come from the search queries in Bing® image search). The search engine returns a candidate set in which the samples are close to the query y in approximate distance measures. The candidate set may be denoted as $S(y) \in X$. A label histogram may be formed as the voting from the candidates bounded by the distance measure:

$$H(l; y) = \sum_{x_i \in S(y)} 1(l-l_i)\delta(\text{dist}(x_i, y) < \epsilon_i) W(\text{dist}(x_i, y))$$

In the above equation, $1(l-l_i)$ is a binary vector on the labels for histogram counting. This takes zeros for all the elements except $l_i$. Function $\delta(\text{dist}(x_i, y) < \epsilon_i)$ is a binary function; it takes 1 when $\text{dist}(x_i, y) < \epsilon_i$ is true. Value $\epsilon\_i$ is a threshold value that is associated with each sample in X. Function $W(\text{dist}(x_i, y))$ is a weighting function on the distance such that the samples closer to the query y contribute more to the histogram. The function $\text{dist}(x_i, y)$ measure the distance between $x_i$ and y, which can be simply L2 $\|x_i - y\|_2$ or L1 $\|x_i - y\|_1$ norms.

Another aspect is a local expert model. The function $\delta(\text{dist}(x_i, y) < \epsilon_i)$ may be replaced by a classifier $C(x_i, y)$, which determines whether the information $l_i$ should be applied to query y. The label histogram is changed to $$H(l; y) = \sum_{x_i \in S(y)} 1(l-l_i) C(x_i, y) W(\text{dist}(x_i, y))$$

Such a classifier $C(x_i, y)$ is a local expert model, because it is only applied when $x_i$ and y are close in the feature space. Therefore, unlike previous methods where classifiers are trained for an entire feature space, classifiers are only trained in local regions, which are much easier to train, although a classifier may be needed for every sample.

Considering performance, simpler, fast computing classifiers are advantageous. Such simple classifiers include thresholding on distance classifier $\delta(\text{dist}(x_i, y) < \epsilon_i)$, logistic regression classifiers and linear Support Vector Machines (SVM's).

With respect to training local expert models, the system needs to decide on the value $\epsilon_i$ for each sample $x_i$. The same image search engine may be used to retrieve similar samples to obtain a candidate set $S(x_i) \in X$; include $x_i$ is also included in $S(x_i)$ in one implementation. For this candidate set, the positive and negative sets are Positive: $\{x_j | x_j \in S(x_i), l_j = l_i\}$, or the samples that share the same label as $x_i$ Negative: $\{x_j | x_j \in S(x_i), l_j \neq l_i\}$, or the samples that do not share the same label as $x_i$ After the positive and negative sets are formed, the system may apply the standard linear SVM training scheme to learn the parameters for the linear classifier.

The next stage 112 (FIG. 1) is directed towards integrating/pruning search results. To this end, some of the bounding boxes have good matches in the database, and the tags are transferred from the database to the query image. However, the tags are not necessarily compatible for the query image. A global graph-based model may be used to integrate/prune the search results to fit to the query image based on the following cues:

The tags of parts of the images are semantically coherent.

The tags for each pixel are unique. A majority vote may be used to clean up the noise in tag transfer.

Figure 7:
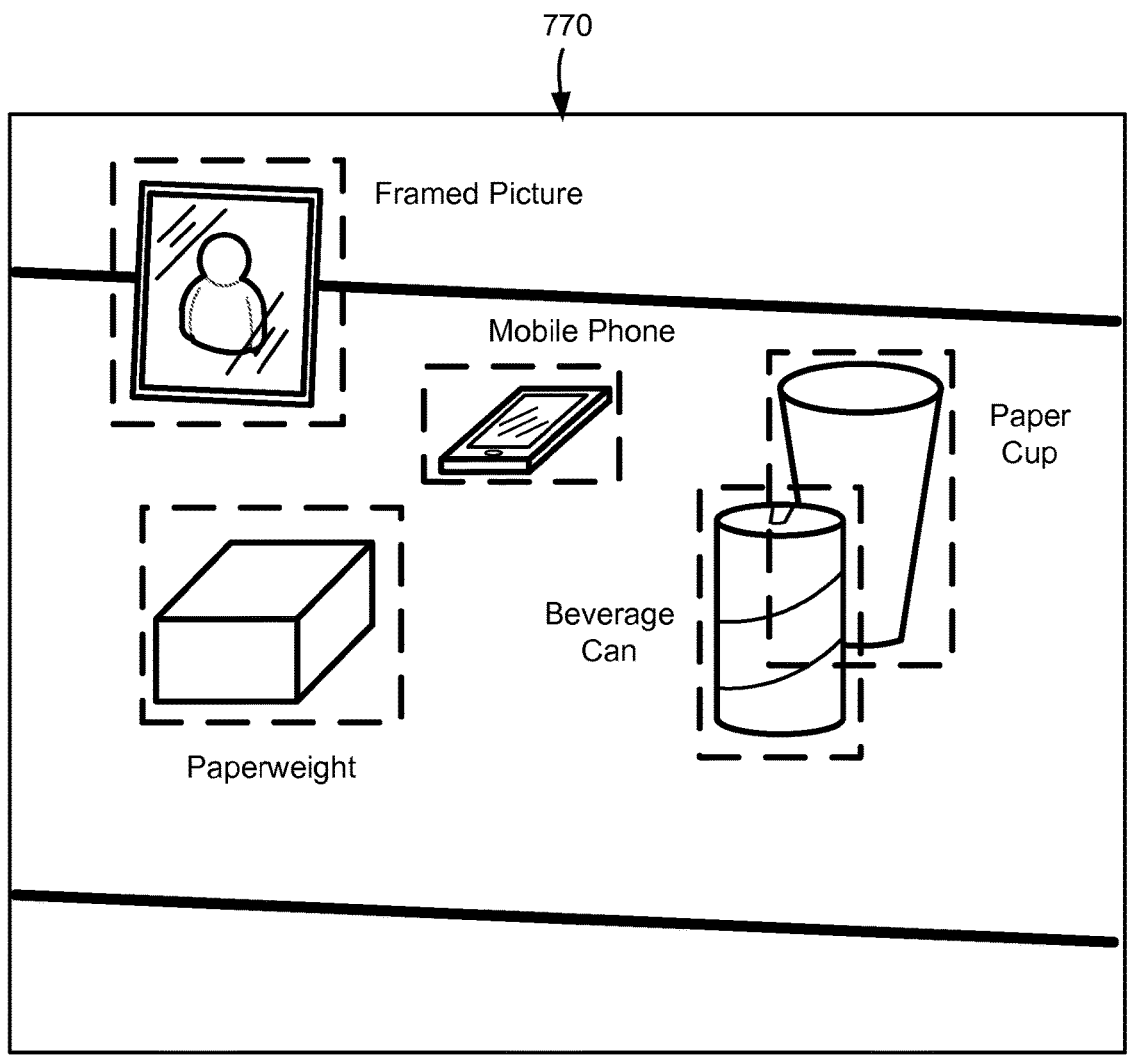
FIG. 7 is a representation of a parsed image having objects therein labeled based upon matched images, according to one or more example implementations.

A representation of the parsed image 770 is shown in FIG. 7, where (e.g., most of) the objects are correctly identified. Note that more distinct tags are typically returned than those depicted in FIG. 5, e.g., instead of "Mobile phone" the tag may be "Windows® phone" if the images that matched best were of Windows® phones.

Figure 3:
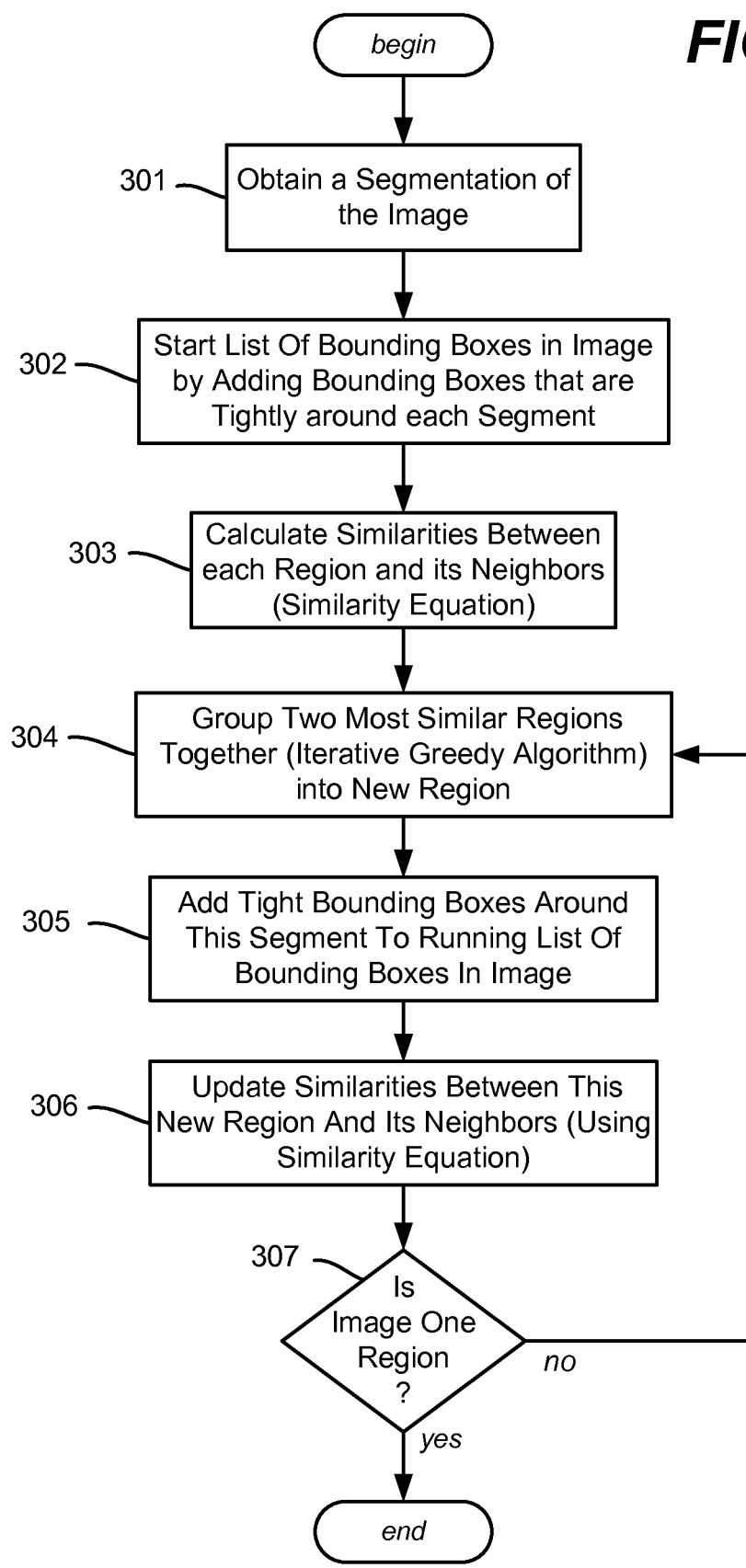
FIG. 3 is a flow diagram showing example steps that may be used to determine bounding boxes for sub-images, according to one or more example implementations.
Figure 8:
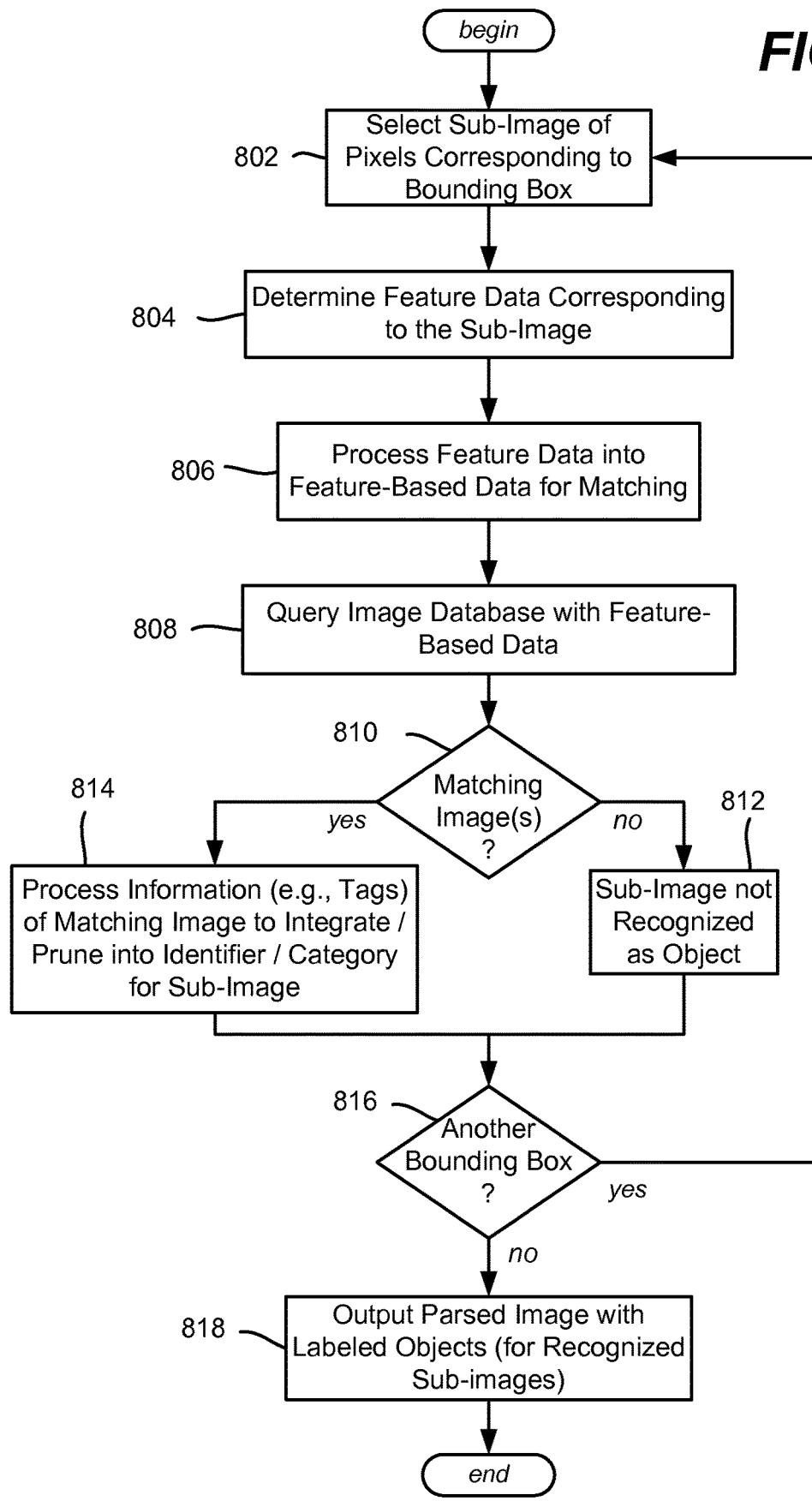
FIG. 8 is a flow diagram showing example steps that may be used to identify and/or categorize sub-images, according to one or more example implementations.

FIG. 8 is a flow diagram summarizing some of the example steps that may be taken once the bounding box or boxes have been determined for an input image, e.g., via the example steps of FIG. 3. Step 802 represents selecting a sub-image of pixels corresponding to a bounding box.

Step 804 featurizes the sub-image into feature data, which step 806 processes for querying/matching, e.g., by reducing the feature data into feature-based data, (e.g., 256 bits to 16 bits via PCA/hashing). Step 808 represents querying with the feature-based data.

Step 810 represents evaluating whether one or more "good" matched images are found; if not, the sub-image was not recognized as an object 812, e.g., identified and/or as belonging to a category. Otherwise, step 814 processes the associated information (e.g., tags) of the matching image or images, integrating and/or pruning the information into an identifier or category for the sub-image.

Step 818 represents outputting the parsed image, e.g., as an image with recognized objects labeled with text or other identifying/categorizing information. Note that other usages for objects identified in images are feasible, e.g., as metadata to group photographs into gallery folders or the like without labeling the image itself.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 9:
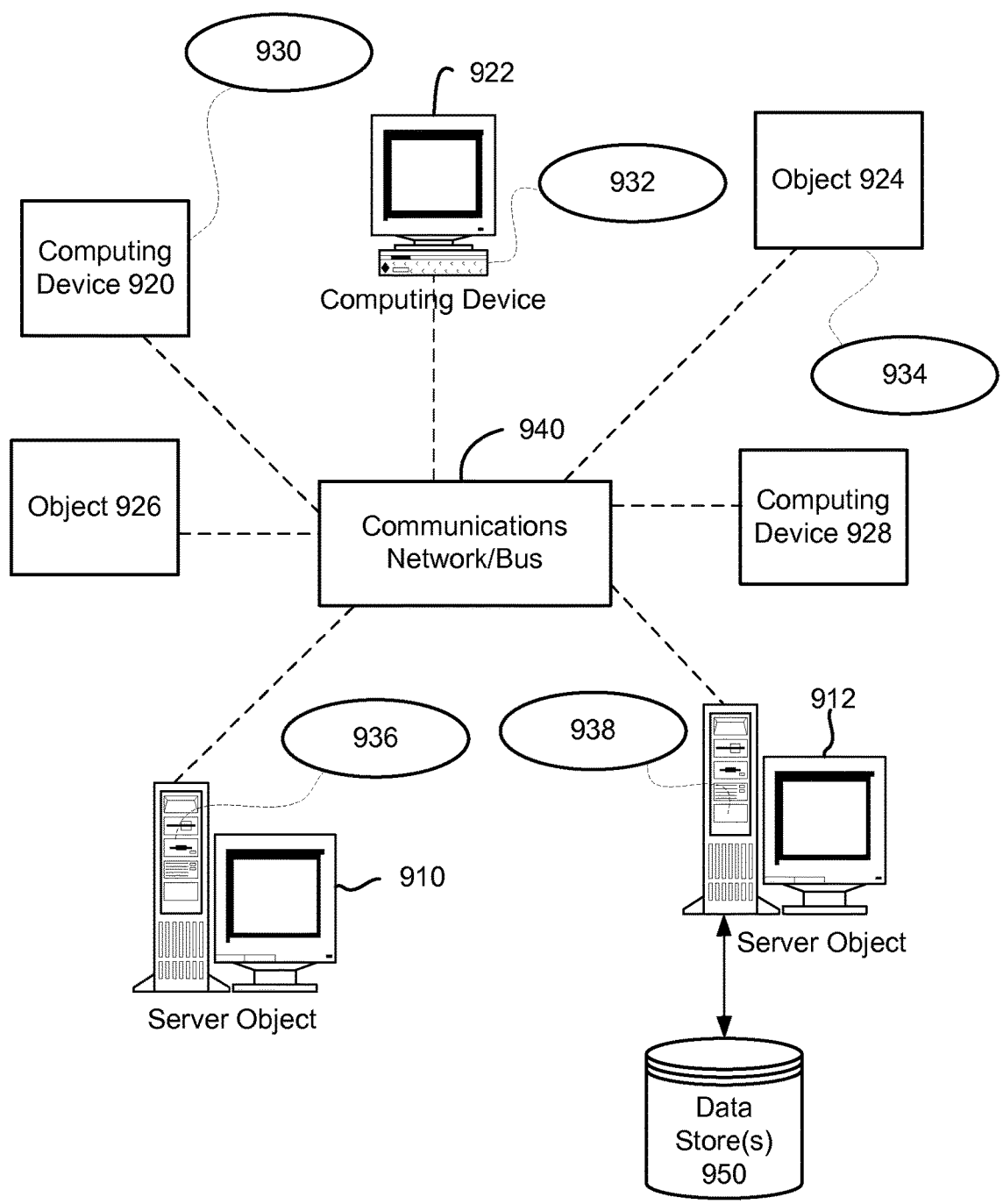
FIG. 9 is a block diagram representing exemplary non-limiting networked environments in which various embodiments described herein can be implemented.

FIG. 9 provides a schematic diagram of an example networked or distributed computing environment. The distributed computing environment comprises computing objects 910, 912, etc., and computing objects or devices 920, 922, 924, 926, 928, 950, etc., which may include programs, methods, data stores, programmable logic, etc. as represented by example applications 930, 932, 934, 936, 938. It can be appreciated that computing objects 910, 912, etc. and computing objects or devices 920, 922, 924, 926, 928, 950, etc. may comprise different devices, such as personal digital assistants (PDAs), audio/video devices, mobile phones, MP3 players, personal computers, laptops, etc.

Each computing object 910, 912, etc. and computing objects or devices 920, 922, 924, 926, 928, 950, etc. can communicate with one or more other computing objects 910, 912, etc. and computing objects or devices 920, 922, 924, 926, 928, 950, etc. by way of the communications network 940, either directly or indirectly. Even though illustrated as a single element in FIG. 9, communications network 940 may comprise other computing objects and computing devices that provide services to the system of FIG. 9, and/or may represent multiple interconnected networks, which are not shown. Each computing object 910, 912, etc. or computing object or device 920, 922, 924, 926, 928, 950, etc. can also contain an application, such as applications 930, 932, 934, 936, 938, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, 950, etc. can be thought of as clients and computing objects 910, 912, etc. can be thought of as servers where computing objects 910, 912, etc., acting as servers provide data services, such as receiving data from client computing objects or devices 920, 922, 924, 926, 928, 950 etc., storing of data, processing of data, transmitting data to client computing objects or devices 920, 922, 924, 926, 928, 950, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 940 or bus is the Internet, for example, the computing objects 910, 912, etc. can be Web servers with which other computing objects or devices 920, 922, 924, 926, 928, 950, etc. communicate via any of a number of known protocols, such as the hypertext transfer protocol (HTTP). Computing objects 910, 912, etc. acting as servers may also serve as clients, e.g., computing objects or devices 920, 922, 924, 926, 928, 950, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 10 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
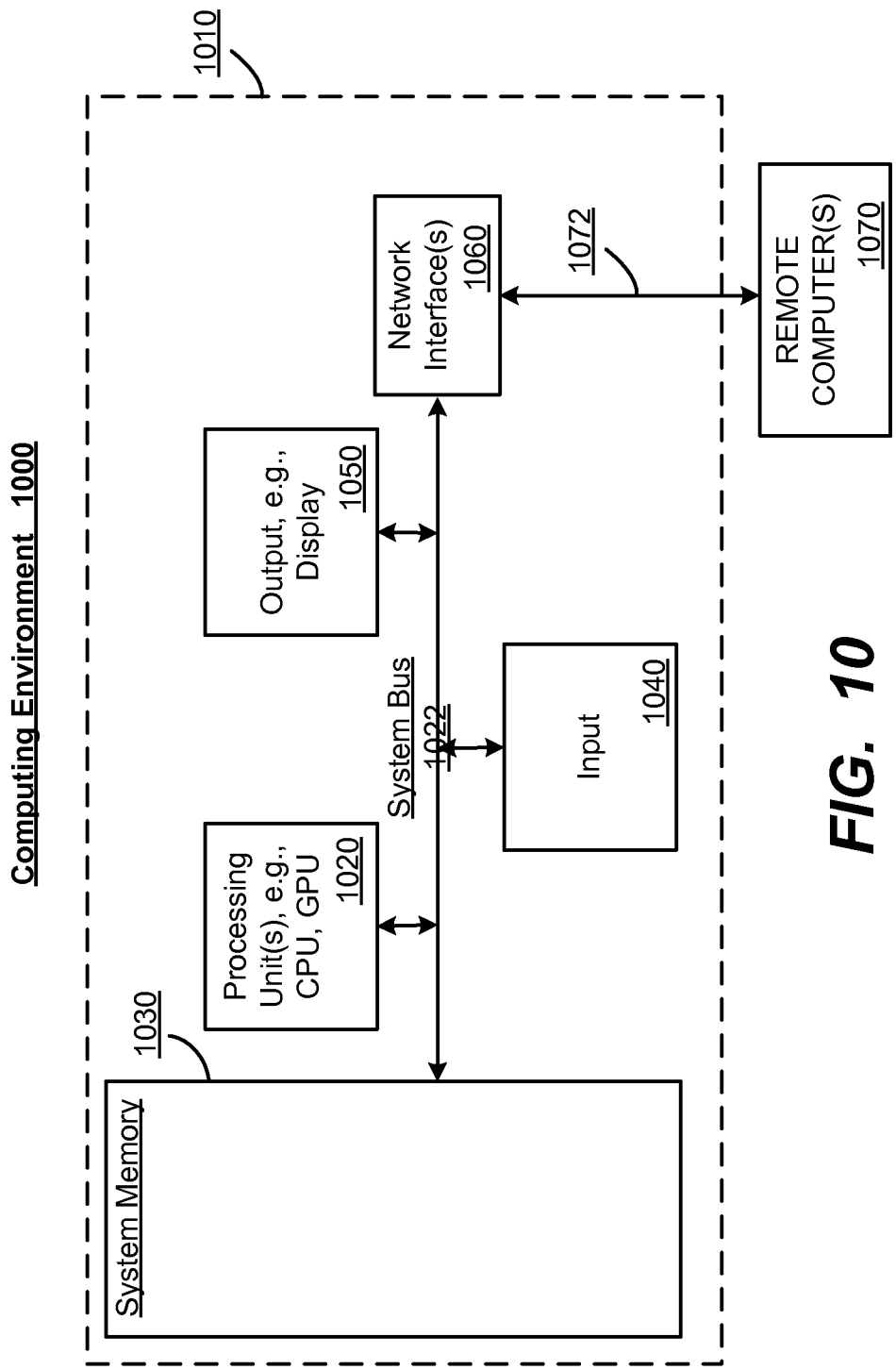
FIG. 10 is a block diagram representing an exemplary non-limiting computing system or operating environment in which one or more aspects of various embodiments described herein can be implemented.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the example computing system environment 1000.

With reference to FIG. 10, an example remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, system memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070, via network interface(s) 1060. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A computer-implemented method for processing an image, the method comprising:
   creating a first bounding box around a first region of interest in an image;
   creating a second bounding box around a second region of interest in the image;
   creating a third bounding box around the first region of interest in the image;
   determining that the first bounding box and the third bounding box meet a variance threshold;
   determining that the second bounding box does not meet the variance threshold;
   determining the first bounding box and the third bounding box overlap;
   based on the determination that the first bounding box and the third bounding box overlap, merging the first bounding box and the third bounding box into a single fourth bounding box;
   extracting a sub-image corresponding to the fourth bounding box;
   querying a remote image-to-image search engine using the sub-image to find a plurality of matched images for the sub-image, the plurality of matched images comprising a first matched image, the first matched image comprising a second object that corresponds to a first object, the second object having a first identifier that provides a category for the second object;
   determining a first matching value based on matching the sub-image with the first matched image;
   determining that the first matching value is greater than a matching value threshold;
   based on determining that the first matching value is greater than the matching value threshold, labeling the sub-image with a sub-image tag that corresponds to an identity of the second object; and
   outputting the image with the labeled sub-image.

2. The method of claim 1 further comprising:
   segmenting the image into segments; and
   creating the first and the second bounding boxes from the segments.

3. The method of claim 2 further comprising, grouping a fifth and sixth bounding box together based upon similarity.

4. The method of claim 1 further comprising extracting features from the sub-image.

5. The method of claim 4 wherein extracting the features comprises using multi-orientation steerable filters.

6. The method of claim 1, wherein labeling the sub-image comprises:
   integrating the identity of the second object; and
   pruning the identity of the second object to fit to the sub-image.

7. The method of claim 6, wherein pruning the identity of the second object comprises determining what identifying information of the one or more matched images is semantically coherent.

8. The method of claim 6, wherein pruning the identity of the second object comprises pruning noisy tags.

9. The method of claim 1, wherein the identity of the second object is a species of the category of the second object.

10. A system comprising:
    a memory including an input image; and
    a processor configured to:
      create a first bounding box around a first region of interest in the input image;
      create a second bounding box around a second region of interest in the input image;
      create a third bounding box around the first region of interest in the input image;
      determine that the first bounding box and the third bounding box meet a variance threshold;
      determine that the second bounding box does not meet the variance threshold;
      determine the first bounding box and the third bounding box overlap;
      based on the determination that the first bounding box and the third bounding box overlap, merge the first bounding box and the third bounding box into a single fourth bounding box;
      select a sub-image corresponding to the fourth bounding box;
      query an image-to-image search engine using the sub-image to obtain identifying information of a plurality of matched images, the plurality of matched images comprising a first matched image, the first matched image comprising a second object that corresponds to a first object, the second object having a first identifier that provides a category for the second object;
      process the identifying information, the process comprising:
        determining a first matching value based on matching the sub-image with the first matched image;
        determining that the first matching value is greater than a matching value threshold; and
        based on determining that the first matching value is greater than the matching value threshold, generating an identifier for the sub-image, the identifier corresponding to the category of the second object.

11. The system of claim 10 wherein the processor is incorporated into one or more of the following: a search engine, a mobile computing device, a personal computing device, and a cloud service.

12. The system of claim 10 wherein the processor is further configured to output a parsed image labeled with the identifier.

13. The system of claim 10 wherein the processor is further configured to extract features from the sub-image, and to query the image-to-image search engine with at least some of the features to obtain the identifying information of the one or more matched images.

14. The system of claim 13 wherein the features comprise global features.

15. The system of claim 10, wherein selecting the sub-image corresponding to the fourth bounding box further comprises determining the fourth bounding box includes a color of interest.

16. One or more computer-readable hardware storage devices storing computer executable instructions, which upon execution perform operations, comprising:
    inputting an image;
    creating a first bounding box around a first region of interest in the image;
    creating a second bounding box around a second region of interest in the image;

creating a third bounding box around the first region of interest in the image;
determining that the first bounding box and the third bounding box meet a variance threshold;
determining that the second bounding box does not meet the variance threshold;
determining the first bounding box and the third bounding box overlap;
based on the determination that the first bounding box and the third bounding box overlap, merging the first bounding box and the third bounding box into a single fourth bounding box;
extracting a sub-image corresponding to the fourth bounding box;
determining sub-image features of the sub-image;
using the sub-image, querying an image-to-image search engine including a plurality of tagged images with features corresponding to the sub-image features of the sub-image, the plurality of tagged images comprising a first tagged image, the first tagged image comprising a second object that corresponds to a first object, the second object having a first identifier that provides a category for the second object;
determining a first matching value based on matching the sub-image with the first tagged image;
determining that the first matching value is greater than a matching value threshold; and
based on determining that the first matching value is greater than the matching value threshold, matching the first object corresponding to the sub-image with the first tagged image.

17. The one or more computer-readable hardware storage devices of claim 16, wherein matching the first object comprises processing information associated with the first tagged image to categorize or identify the first object.

18. The one or more computer-readable hardware storage devices of claim 16, wherein generating the first, second, and third bounding boxes comprises segmenting the image into segments and processing the segments.

19. The one or more computer-readable hardware storage devices of claim 18, wherein processing the segments comprises determining that the fourth bounding box meets a color variance threshold.

20. The one or more computer-readable hardware storage devices of claim 16 storing further computer executable instructions, which upon execution perform an operation comprising, labeling the first object in the image that is matched to the first tagged image with an identity of the second object.

* * * * *